Dec. 2, 1958      D. F. BROWER      2,863,002
MAGNETIC TRANSDUCER
Filed Sept. 7, 1954      2 Sheets–Sheet 1
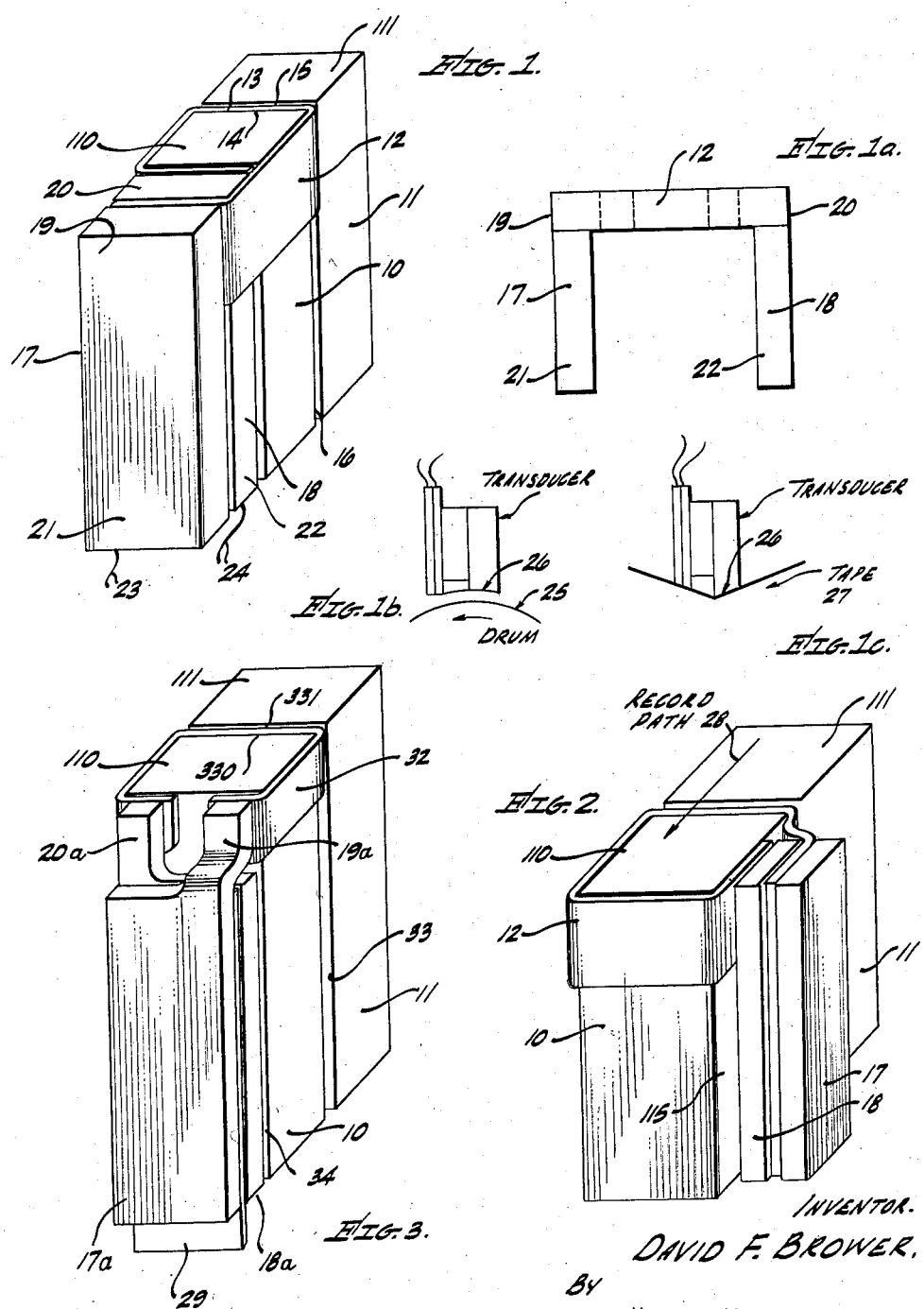
INVENTOR.
DAVID F. BROWER.
BY
Henry Heyman
ATTORNEY.

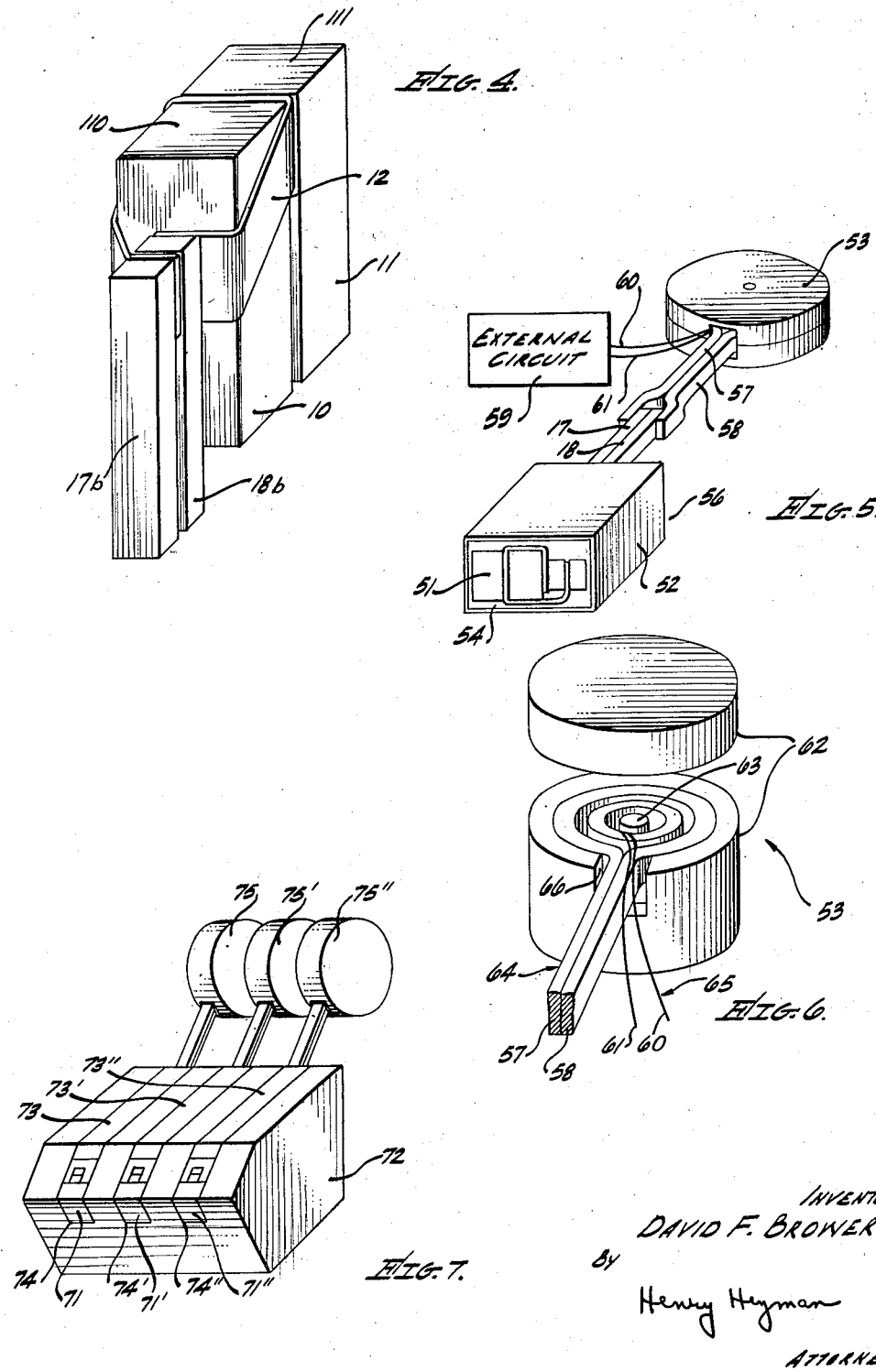

United States Patent Office 2,863,002
Patented Dec. 2, 1958

2,863,002

MAGNETIC TRANSDUCER

David F. Brower, Torrance, Calif., assignor to Hughes Aircraft Company, Culver City, Calif., a corporation of Delaware Application September 7, 1954, Serial No. 454,551

15 Claims. (Cl. 179—100.2)

The present invention relates to magnetic transducers, and more particularly to a magnetic head for recording, reproducing or erasing information stored as states of magnetization on lengthy magnetizable bodies.

Heretofore, it has been proposed that information may be recorded by magnetizing discrete areas of lengthy magnetizable bodies in accordance with the information to be stored. Such magnetization has been accomplished by placing a magnetic transducer or head adjacent the body to be magnetized, such as a wire, a tape or a drum, and exciting the transducer with an electric current representing the information to be stored. The transducer is usually so arranged that the recording is carried out while the body to be magnetized is in motion relative to the transducer.

The magnetic transducers heretofore utilized have generally made use of the fringing flux associated with a gap in an excited electromagnetic structure to produce a magnetic field for magnetizing the translatable record body. Alternatively, excitation of the magnetic transducer has been carried out by means of a current flowing either through a coil disposed on a portion of the magnetic structure of the transducer remote from the position of the gap or by means of a conductor disposed within the gap.

Transducers of the first class, that is, coil excited transducers, suffer from a number of inherent defects. For example, the major portion of the flux which crosses the gap crosses within the structure of the head, and only a minor portion of the flux is "fringing" flux and available for recording. Accordingly, the efficiency of such heads is inherently low.

Numerous types of magnetic transducers have been proposed for overcoming the above and other deficiencies of coil type transducers. One particular class, hereafter referred to as the "single-turn head," utilizes a single conductor, disposed in the gap, to excite the magnetic structure of the head, and thereby produce the flux which is utilized in recording.

While such transducers in theory are inherently more efficient than coil type transducers, the expected improvement has been difficult to achieve in practice. In fact, the single turn transducers heretofore proposed have suffered from fabrication difficulties and operational limitations which have tended to make them less attractive than coil type transducers for most applications.

For example, U. S. Patent 2,479,308 entitled "Magnetic Recorder Head," by M. Camras, issued August 16, 1949, proposes a single-turn transducer including a unitary magnetic structure having a slot cut in one edge thereof, within which a single flat conductor is disposed. The accurate milling of the structure to provide a slot 1 mil in width, and the positioning of a flat conductor of equivalent dimension within the resultant slot are, however, operations which require a large amount of skill and precision. The fabrication of identical units, a necessity if the transducers are to be interchangeable is extremely difficult, despite the apparent simplicity of the design.

Similarly, U. S. Patent 2,536,272 entitled "Magnetic Recording-Reproducing Head," by A. W. Friend, issued January 2, 1951, proposes a single-turn transducer wherein the magnetic structure is composed of a plurality of thin strips of magnetic material. Because of the inherent flexibility of such elements, the final configuration assumed by the transducer will depend on a great many factors, such as the shape of the shielding blocks, for example. The control of such factors again requires a high order of skill and precision.

Moreover, the electrical characteristics of the prior art single-turn transducers leaves much to be desired. More particularly, since single-turn transducers are inherently low impedance devices, the flux fields associated with all of the conducting elements of the transducer must be considered in evaluating the operating performance of such transducers. While the flux field associated with the conductor disposed within the gap of a single-conductor transducer is almost totally available for recording purposes, the flux fields associated with the remainder of the conducting elements of the prior art single-conductor transducers actually detract from their operating efficiency owing to the fact that where the lines of flux do not close within the transducer structure extraneous flux paths are set up in space. This extraneous flux tends to increase the impedance of the transducer, and makes it necessary to utilize increased amounts of driving power to excite the transducer. In addition, during recording operations these extraneous flux paths produce a field which may interfere with adjacent transducers or other magnetic devices. Similarly, during the reading operation external flux may induce currents in the transducer through these flux paths; thus raising the noise level and reducing the sensitivity of the transducer.

Such single-turn transducers as have heretofore been proposed have failed to recognize the deleterious effects of these stray flux paths, or, having recognized them, have failed to provide suitable means for eliminating them.

It is, therefore, an object of the present invention to provide a magnetic transducer which overcomes the above and other disadvantages of the prior art and which is characterized by ease of fabrication and operating efficiency heretofore impossible of achievement.

Another object of the present invention is to provide a magnetic transducer of simple and rugged construction, which may readily be fabricated to extremely close tolerances.

A further object of the present invention is to provide a magnetic transducer of great simplicity, yet possessing a high operating efficiency.

Yet another object of the present invention is to provide a single-turn magnetic transducer which is effectively shielded and isolated from external flux fields by the component parts of the transducer itself.

A still further object of the present invention is to provide a single-turn magnetic transducer in which external flux fields produced by current flowing in the transducer are practically all available for useful recording.

A further object of the present invention is to provide a magnetic transducer which may readily be arranged as a multiple head assembly or array for simultaneously reading and recording on the same record track, or on a plurality of closely spaced parallel tracks.

Still another object of the present invention is to provide a single-turn magnetic transducer of low impedance, which may be readily driven from a high impedance source.

A magnetic transducer in accordance with the present invention comprises first and second core pieces, each having a pole face, said pole faces having adjacent edges spaced from each other and disposed in a common plane.

A flat ribbon conductor substantially encircles one of the core pieces at an end adjacent its pole face, hereafter referred to as a "pole face end." The portion of the ribbon passing between the core pieces has an edge disposed in said common plane, the pole pieces being spaced apart near the pole faces by this portion of the ribbon. Preferably, a pair of superposed flat conductive bars extending along and parallel to one of the core pieces have their one ends connected to the ends of the ribbon conductor, while the other ends are connected to an external circuit for driving the transducer when recording, or for receiving current when reading.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a perspective view of one embodiment of the magnetic transducer of the present invention;

Fig. 1A is an elevational view illustrating the development of the electrical conductors employed in the transducer of Fig. 1;

Figs. 1B and 1C are elevational views illustrating various shapes of the transducer pole faces to adapt them for different translatable record bodies;

Figs. 2, 3 and 4 are perspective views of other embodiments of the magnetic transducer, according to the present invention;

Fig. 5 is a schematic view of a magnetic transducer according to the invention which includes a flux shield and a driving transformer;

Fig. 6 is a schematic view, in exploded form, of the driving transformer included in the transducer of Fig. 5; and Fig. 7 is a schematic view in perspective of a multiple transducer array, according to the present invention, which includes a plurality of individual magnetic transducers for recording a plurality of parallel magnetic tracks.

Referring now to the drawings, wherein like reference characters designate like or corresponding parts throughout the several embodiments, there is shown in Fig. 1 one embodiment of the magnetic transducer of the present invention. As shown in Fig. 1, the transducer includes first and second oblong core pieces 10 and 11, having adjacent pole faces 110 and 111, respectively. Core pieces 10 and 11 are in contact with each other along a line 16 remote from their pole faces, and are separated at their pole faces by a flat ribbon or band conductor 12. Ribbon conductor 12 encircles core piece 10 at its pole face end, that is, adjacent its pole face 110, the portion of ribbon 12 lying between the core pieces having an edge 13 disposed in the plane defined by the edges 14 and 15 of the pole faces facing ribbon conductor 12. A pair of superposed, flat, conductive bars 17 and 18, extending along and parallel to core piece 10, have their upper portions 19 and 20 connected to the ends of ribbon 12, respectively, while their opposite portions 21 and 22 may be connected to an external circuit, not shown, by means of leads 23 and 24 attached thereto.

More particularly, core pieces 10 and 11 preferably are of a material having high magnetic permeability, low magnetic retentivity, and high specific resistivity. Some magneto-ceramic materials display these properties, and accordingly, the core pieces may be of magneto-ceramic material, such as the ferrite materials. Core pieces 10 and 11 may be identical in all respects, and may be fabricated to as close tolerance as desired, using techniques well known in the art. The use of core pieces having a high specific resistance obviates the necessity of including insulation between the core pieces and the normally current conductive elements of the transducer such as ribbon 12. Thus core pieces 10 and 11 are placed in intimate contact with ribbon 12, thus increasing the magnetic efficiency of the structure.

Flat ribbon conductor 12 may be of copper or silver, or similar highly conductive material. The conductor may be 1 or 2 mils thick, the thickness of the ribbon serving to establish the width of the recording gap in the magnetic structure. Alternatively, the ribbon may be of any other thickness, the selected dimension being based on considerations well known in the magnetic recording arts.

The interconnection of ribbon 12 and conductive bars 17 and 18, and their final assembly in the form shown in Fig. 1 may be most readily achieved by initially assembling them in the form shown in Fig. 1A. As shown in Fig. 1A, ribbon 12, cut to appropriate length, is electrically connected, as by spot welding or soldering, at each end to one portion 19 and 20 of elements 17 and 18, respectively. The connection is made in such a manner that elements 17 and 18 are parallel to each other, and at right angles to ribbon 12. Alternatively, the parts shown in Fig. 1A may be fabricated in a single piece, using technique well known in the art.

Continuing the assembly operation, core piece 10 may first be placed between bars 17 and 18 in appropriate relation to ribbon 12, and bars 17 and 18 may then be disposed in line with each other and with core piece 10 in such a manner that ribbon 12 encircles core piece 10 as shown in Fig. 1. The lines along which ribbon 12 is folded to encircle pole piece 10 and fold about an edge of bar 18, are indicated by dotted lines in Fig. 1A. A piece of paper, or similar insulating material, not shown, may be placed between bars 17 and 18 in order to electrically insulate the bars and the ends of ribbon 12 from each other. Core piece 11 may then be placed in proper abutting relationship with the assembly thus formed. The resulting transducer may be encapsulated in plastic, or placed in any other type housing which will maintain the parts in appropriate relationship.

For recording intelligence, a translatable record body may be caused to pass successively over pole face 110, the gap defined by ribbon 12, and pole face 111, electrical current representing the data to be recorded meanwhile being applied to the transducer by means of leads 23 and 24 attached to conductive bars 17 and 18. The transducer of the present invention may be used either for contact recording, that is, with the transducer in contact with the record body, or for non-contact recording, that is, with the transducer merely in close proximity to but spaced from the record body. Preferably, the record body may be moved at right angles to the portion of ribbon 12 which is between core pieces 110 and 111. The transducer may be employed in a similar manner for reading or picking up information which has already been recorded, or for erasing, in accordance with systems well known in the art.

After completing the assembly of the transducer, the pole face ends may be shaped to any desired contour, thereby improving the operational characteristics of the transducer. For example, as shown in Fig. 1B, where the transducer is to be employed for recording on a cylindrical drum surface 25, the pole face end 26 of the transducer may be ground to a concave shape of approximately the same radius as that of the drum. Such shaping has been found to be of value when the transducer is utilized in non-contact recording, and of especial value when the transducer is utilized in contact with the drum surface. Where the transducer is to be employed in conjunction with a flexible magnetizable tape 27, the pole face end 26 of the transducer may be ground to a generally V shape, and the tape drawn across the pole face end of the drum in tension, as shown in Fig. 1C. Under such conditions, folds and creases in the tape tend to be "ironed out" as the tape passes across the transducer, and the reliability of operation is substantially improved.

The advantages of the transducer of the present invention in manufacture and assembly over the prior art transducers will at once be readily apparent. In particular, the transducer may be readily scaled to any desired dimensions Thus the transducer may be made as small as desired without unduly complicating either its fabrication or assembly. It will also be noted that the tolerance of the dimensions of the head is determined almost completely by the tolerance maintained in shaping the core pieces. Since these pieces are merely oblong rectangular pieces, their fabrication to close tolerances will present no unusual problems.

Similarly, it will be noted that a further advantage of the construction thus described is that the planeness of the active portion of ribbon 12 in the gap between core pieces 10 and 11 is determined by the planeness of the portions of core pieces 10 and 11 abutting the ribbon. Since the core pieces are essentially rigid elements, and may be readily machined to the planeness required, planeness of a high order may be imparted to ribbon 12. The use of a malleable material, such as silver, for conductive ribbon 12, contributes to the achievement of this advantage, the ribbon readily conforming to the shape required when compressed between the two core pieces.

A further advantage of the present transducer is that the location of the gap with respect to the external mounting surfaces of the transducer is again purely a function of the shape of the core pieces, and since the core pieces have regular geometric shapes, their fabrication to a high order of accuracy, and consequently, the accurate positioning of the completed transducer with respect to the tape or drum, may be readily achieved.

Still another advantage of the embodiment of the transducer shown in Fig. 1 is that the width of the transducer is only slightly greater than the width of the track of the tape or drum. Accordingly, additional transducers may readily be placed closely adjacent to each other in order to provide for the recording of closely spaced parallel tracks on the same tape or drum. As will be more fully discussed hereinafter, the transducer of the present invention is particularly useful for such applications.

In operation, the transducer of the present invention offers a number of advantages over conventional coil type transducers, as well as over the single-turn type transducers heretofore proposed. Since the magnetomotive force due to the current flowing in the ribbon is generated at the gap, there is essentially zero leakage flux except for the unavoidable leakage which occurs through the space between the transducer and the record body. The single-turn ribbon encircles one of the core pieces adjacent the pole face, current thereto being carried by a pair of flat, overlaying bars 17 and 18. This form of construction results in the confinement of practically all the flux produced by current flowing in the conductive parts of the transducer to the pole face ends of the transducer. More particularly, since the conductive ribbon encircles one of the core pieces at the pole face end, the flux produced by the ribbon follows a path of minimum length, which contributes to the reduction of stray flux and of the impedance of the transducer. The use of a flat ribbon and flat conductive bars, rather than elements of circular cross section, also tends to reduce the impedance of the transducer. Similarly, the use of flat overlaying bars as conductive leads to the single-turn ribbon produces what may be called a "self-shielding" configuration, tending to reduce the stray flux produced by current flowing in these parts. The reduction of this flux, as heretofore discussed, tends to reduce the impedance of the transducer due to stray flux paths, as well as contributing to the electrical isolation of the transducer from its surroundings.

The embodiment of the transducer of the present invention shown in Fig. 1 may be said to be characterized by the feature that conductive bars 17 and 18 are generally disposed in a plane parallel to the plane of the gap. This feature, as heretofore discussed, reduces the overall width of the transducer across the gap, and serves to make this embodiment especially useful for recording closely spaced parallel tracks by employing a plurality of closely spaced heads. Where it is desired to closely space heads for recording on or reading from the same record track, the embodiment of the invention shown in Fig. 2 may be used with advantage.

The transducer of Fig. 2, includes all of the parts of the transducer of Fig. 1, differing only in the relative disposition of conductive bars 17 and 18 with respect to the portion of ribbon 12 lying between core pieces 10 and 11. More particularly, conductive ribbon 12 encircles one of the core pieces 10 as heretofore described, but the ribbon and conductive bars 17 and 18 are arranged so that conductive bars 17 and 18 are superposed on one side 115 of core piece 10, disposed substantially at right angles to the plane of the active portion of ribbon 12 in the gap between core pieces 10 and 11. The transducer of Fig. 2 may be assembled following steps similar to those discussed in connection with the embodiment of Fig. 1.

As will be readily apparent, placing conductive bars 17 and 18 at one side of the transducer reduces the length of the transducer along the direction of record travel as indicated by arrow 28, the length being no greater, at any plane through the transducer, than the combined width of the gap and the pole pieces. Accordingly, a plurality of transducers may be very closely spaced for recording on or reading from the same signal track. At the same time, this alternative disposition of conductive bars 17 and 18 in no way alters the operational properties of the transducer, the self-shielding property heretofore discussed being fully retained, and in fact contributing measurably to the efficiency and usefulness of the transducer in this type application. In practice, with the component parts of the transducer appropriately scaled, it has been found possible to position transducers so that their gaps fall within .08" of each other, without affecting the operation of the tranducers.

Another embodiment of the transducer of the present invention is shown in Fig. 3. The embodiment includes all of the component parts shown and discussed in connection with the embodiment of Fig. 1, differing only in the mode of construction of the transducer. More particularly, as shown in Fig. 3, the transducer includes first and second oblong core pieces 10 and 11, composed of a material having high magnetic permeability, low magnetic retentivity, and high specific resistivity. A band or ribbon of conductive material 32 substantially encircles core piece 10 at an end adjacent pole face 110, the band being so placed that the portion of the band along one side 33 of core piece 10 extends from one edge 330 of pole face 110 along the side of the core piece, and the ends of the band meet, but do not touch, along the opposite side 34 of the core piece. The band of conductive material 32 may conveniently be placed on core piece 10 by plating or painting a conductive material, such as silver or silver paint, on an appropriately masked region of core piece 10, using techniques well known in the art, and not considered within the scope of the present invention. Core piece 11 is placed adjacent side 33 of core piece 10 in such a manner that one edge 331 of pole face end 111 of core piece 11 is separated from edge 330 of core piece 10 by the thickness of band 32, whereby a gap is formed between parallel edges 330 and 331.

Electric current for exciting the transducer is supplied to conductive band 32 by means of a pair of superposed or overlapping conductive bars 17a and 18a. Conductive bars 17a and 18a, which may conveniently be composed of copper or similar current conductive material, are flat, and have their ends 19a and 20a, respectively, shaped so that placing the elements along side 34 of core piece 10 will cause said one ends to establish electrical connection with a corresponding end or terminal of conductive band 32. A thin sheet of insulating material 29, such as paper or a plastic sheet, is interposed between bars 17a and 18a to insulate the elements in their overlapping regions.

The embodiment of Fig. 3 possesses all the features of the transducer of Fig. 1, and therefore offers the same advantages in operation. In particular, it should be noted that conductive band 32 may be plated or coated to a narrower thickness than would be possible if a ribbon of conductive material were used, and accordingly, the band, and consequently, the gap, may be made as narrow as desired, resulting in increased resolution in accordance with well known magnetic recording principles. If desired, conductive band 32 may be shaped in a manner to be discussed more fully hereinafter in connection with Fig. 4.

Still another embodiment of the transducer of the present invention is shown in Fig. 4. The transducer of Fig. 4 includes all of the component parts of the embodiment shown and described in connection with Fig. 1, differing only in the shape and relative placement of the parts. More particularly, ribbon 12 is arranged to encircle core piece 10 in such a manner that only that portion of ribbon 12 lying between core pieces 10 and 11 has its upper edge lying substantially in the plane common to the contiguous edges of the pole faces 110 and 111. The remaining portions of the ribbon are arranged to encircle core piece 10 at an acute angle with respect to the plane through the gap between core pieces 10 and 11, being connected to superposed conductive bars 17b and 18b at a point relatively remote from the ends of the core pieces.

This configuration of parts may be readily achieved by initially forming ribbon 12 and conductive bars 17 and 18 to an appropriate shape and assembling these parts and the core pieces following a procedure similar to that outlined in connection with the embodiment of Fig. 1. Alternatively, the ribbon may be plated or painted as discussed in connection with the embodiment of Fig. 3, the required variations being obvious.

The transducer of Fig. 4 offers the same manufacturing advantages heretofore discussed. In operation, the embodiment offers, in addition to the advantages previously discussed, the particular advantage that the portions of ribbon 12 other than the portion between the core pieces lie in a plane remote from the plane of the record body, and accordingly, the flux produced by current flowing in these portions of the ribbon does not pass through the record body.

While it has been found in practice that this flux ordinarily does not detract from the performance of the transducer, being at right angles to the flux utilized in recording, it is to be understood that there may be applications in which it may be more advantageous to isolate this flux from the pole faces of the transducer. The present embodiment represents an example of one manner in which this may be done, in accordance with the present invention.

The operating efficiency of the transducer of the present invention may be further increased by enclosing the transducer in a conductive shield, and by including a suitable transformer as an integral part of the transducer structure. Such a transducer in accordance with the present invention is shown in Fig. 5, while the mode of construction of a preferred type of transformer is shown in greater detail in Fig. 6.

As shown in Fig. 5, the embodiment includes a transducer 51, a conductive shield 52, and an impedance transformer 53 for connecting transducer 51 to an external circuit 59. More particularly, transducer 51 is the single-turn transducer of the present invention, and may have any of the forms heretofore discussed. Surrounding transducer 51 is a conductive shield 52 having the shape of an open-ended box, which may be of copper or other material having high electrical conductivity. Conductive shield 52 has an opening 54 in one end thereof for presenting the pole face end of transducer 51 to a translatable record body such as a tape or drum, and an additional opening 56 for passing conductive bars 17 and 18. Conductive bars 17 and 18 may conveniently be merely extensions of the conductive bars 17 and 18 of transducer 51, these bars being originally fabricated of sufficient length to pass through the shield. An insulating sheet material, such as plastic or paper, may be interposed between conductive shield 52 and the normally current conductive portions of transducer 51 in order to electrically insulate the shield from the transducer.

In practice, it has been found that conductive shield 52 may conveniently be a copper tube of circular or rectangular cross section, and of appropriate dimension to closely surround the transducer. If desired, the shield may be formed from a flat strip of conductive material to appropriate form and dimension. Alternatively, the shield may be formed to serve as both a mounting and aligning device, as shown and discussed more fully in connection with the embodiment of the invention shown in Fig. 7.

It should be noted that the regular geometrical shape of the transducer of the present invention lends itself especially well to the use of a shield of simple shape, in intimate contact with the transducer. Further, the compact design of the transducer makes it possible to utilize a shield having apertures only where required for presenting the transducer to the record body and for passing the leads to the transducer. Accordingly, the shield may be a continuous, conducting structure, requiring no discontinuities for insulating the component parts of the transducer.

In operation, the use of a shield serves to further confine the flux field produced by the transducer to its pole face end. In particular, the use of a shield has been found to increase the efficiency of the present transducer, to lower stray flux fields, and to lower the impedance of the transducer. The transducer of the invention shown in Fig. 5 does, in fact, represent a preferred embodiment of the invention.

As previously discussed, the impedance of the transducer of the present invention is low, when compared, for example, with conventional coil type transducers. Accordingly, it is generally necessary to provide an impedance transformer for coupling an external circuit to the transducer, if efficient operation is to be achieved. While it is possible to employ conventional transformers for such purpose, a number of advantages result if a transformer such as that shown in Fig. 5, and in greater detail in Fig. 6, is utilized.

Refering now to Fig. 6 there is shown a schematic view, in exploded form, of impedance transformer 53. Transformer 53 comprises a closed cylindrical container 62 having a center post 63, composed of magnetic material such as a ferrite, a primary winding 64, and a secondary winding 65 within container 62. Primary winding 64 is a single preformed strap of flat conductive material, and may, for example, have the same cross-section as bars 17 and 18. Winding 64 has its central portion formed in a circle, while the ends are parallel and adjacent to each other, so that when the transformer is assembled, the circular portion of the winding encircles center post 63, to form the primary winding, and the ends extend through an aperture 66 in container 62 to form primary leads 57 and 58. The secondary winding, of an appropriate number of turns of wire, is arranged to similarly slip over center post 63, and the ends of the secondary winding also extend through aperture 66 to form secondary leads 60 and 61.

Transformer 53 may, as shown in Fig. 5, be connected to transducer 51 by connecting primary leads 57 and 58 to bars 17 and 18, while the secondary of the transformer may be connected to an external circuit 59 by means of secondary leads 60 and 61.

The transformer of Figs. 5 and 6 will thus be seen to offer a number of advantages in fabrication, in particular, being of essentially simple design and construction. The transformer may readily be scaled to preferred dimensions, and may be disposed with respect to the transducer in any preferred manner by bending the leads between the transducer and the transformer. The transformer offers a number of advantages in operation which make it particularly useful in conjunction with the transducer of the present invention. More particularly, the use of flat, adjacent leads to the primary winding, which is itself a single turn of similar cross section, results in a low impedance primary winding optimally matched to the transducer. The use of cup type cores, and adjacent leads to the primary winding effectively reduces the stray fields due to currents flowing in the conductive parts of the transformer, and thus the transformer displays "self-shielding" characteristics similar to those of the transducer. Accordingly, the combination of transducer and transformer forms a unit characterized by high efficiency and low stray flux fields.

The transducer of the present invention is particularly useful where a plurality of transducers is disposed for simultaneously recording signals on a plurality of parallel record paths of a single tape or drum. A particular advantage of the present transducer in such applications is the fact that the recording gaps of a plurality of transducers may be accurately aligned on a common line without resorting to precision assembly techniques.

An example of such a configuration, which provides for three transducers for the parallel recording of three record tracks, is shown in Fig. 7. The transducer array of Fig. 7 includes first, second and third transducers 71, 71', and 71", respectively, a mounting and shielding block 72, and three retaining strips 73, 73', and 73", for retaining the transducers within mounting and shielding block 72.

More particularly, mounting and shielding block 72 is a block of rigid conductive material such as copper or brass, having three slots 74, 74', and 74" in one edge thereof. Slots 74, 74', and 74" are cut, as by milling, to a depth such that the bottom of each slot lies along a common line. The slots are of sufficient depth and width to receive transducers 71, 71', and 71", respectively. Transducers 71, 71', and 71", which are preferably similar transducers, may be any of the embodiments of the transducer of the present invention. It will be readily recognized that if the transducers are positioned within the slots with corresponding core pieces adjacent to the bottom of each slot and these corresponding core pieces are the core pieces 10 not encircled by the ribbon, the position of the gap with respect to the bottom of each slot will be purely a function of the width of the core pieces 10. Since the fabrication of any number of core pieces to a common dimension may be readily achieved, it will be seen that the gaps of transducers 71, 71', and 71" will fall along a common line without further adjustment. Retaining strips 73, 73', 73" may then be placed over each transducer and fastened, as by soldering or similar technique, in order to retain the transducers within their respective slots. The three retaining strips may preferably be of a highly conductive material such as copper or brass, in which case the configuration of block 72 and of the retaining strips will be seen to perform the shielding operation of the conductive shield of the embodiment of Fig. 4, as well as the mounting function above noted. A strip of paper or a similar insulating sheet material may preferably be placed between the normally current conductive parts of transducers 71, 71' and 71", block 72 and retaining strips 73, 73' and 73" in order to prevent the short-circuiting of the transducers.

Block 72 may conveniently have a depth selected in accordance with the length of the core pieces of the transducers, with only the conductive bars extending beyond the block, in order to conveniently establish electrical connection thereto. As shown in Fig. 7, each transducer is connected to a transformer 75, 75', and 75", respectively, the transformers being similar to that shown and described in connection with the embodiment of Figs. 5 and 6. Where the transformers are of greater width than the desired inter-transducer spacing, the transformers may conveniently be displaced with respect to each other by bending their primary leads in order to facilitate assembly of the unit as illustrated in Fig. 7.

The conductive bars 17 and 18 of the transducers and the primary leads of the transformers may be of sufficient stiffness to maintain the position of the transformers with respect to the transducers so that the entire array may be held in operating position by mounting means affixed to block 72, thereby facilitating mounting and positioning of the unit.

Following assembly of the transducers, mounting block and retaining strips, the pole face end of the assembly may be shaped by grinding to any desired contour for presentment to a tape or drum, as previously discussed. As shown in Fig. 7, the shape may be generally a V-shape, as for example where the array is to be used for recording parallel tracks on tape.

There has thus been disclosed a magnetic transducer characterized by ease of fabrication and operating efficiency heretofore impossible of achievement.

What is claimed as new is:

1. A magnetic transducer comprising a first unitary core piece, a secondary unitary core piece, each of said core pieces being of ferrite material and having a substantially rectangular parallelepiped shape and having a pole face, said pole faces having adjacent edges spaced from each other and disposed in a common plane; a single flat ribbon conductor substantially encircling one of said core pieces and having a portion disposed between said core pieces, said ribbon conductor having a thickness considerably less than that of said core pieces, said ribbon conductor further having an outer edge diposed in said common plane, said core pieces being spaced apart near the pole faces at least by the thickness of said ribbon conductor, and means providing electrical connections to the ends of said ribbon conductor.

2. The transducer defined in claim 1, wherein said means providing electrical connections to the ends of said ribbon conductor includes a pair of superposed flat conductive bars extending along and parallel to one of said core pieces.

3. The transducer defined in claim 2, including a cup core transformer for driving said transducer, said transformer having a single-turn primary winding coupled to said conductive bars and a multiple-turn secondary winding adapted to be coupled to an external circuit.

4. The transducer defined in claim 1, wherein said means providing electrical connections to the ends of said ribbon conductor includes a pair of superposed flat conductive bars extending along a side of one of said core pieces substantially parallel to said portion of said ribbon.

5. The transducer defined in claim 1, wherein said means providing electrical connections to the ends of said ribbon conductor includes a pair of superposed flat conductive bars lying along a side of one of said core pieces substantially at right angles to the plane of said portion of said ribbon.

6. A magnetic transducer head comprising two oblong cores of ferrite material having relatively high magnetic permeability and relatively low magnetic retentivity, each having a pole face, said pole faces being spaced apart to define a pair of adjacent magnetic poles with a gap therebetween, the edges of said pole faces adjacent said gap extending in a common plane, and a single current carrying ribbon, encircling one of said cores, and passing through said gap, the portion of said ribbon lying within said gap having one edge lying along said common plane, said ribbon having a thickness considerably less than that of said cores, said cores being in contact with said ribbon adjacent said pole faces.

7. The transducer head defined in claim 6, including means providing electrical connections with the ends of said ribbon.

8. The transducer head defined in claim 7 wherein said means includes a pair of flat superposed conductive bars, extending along one side of one of said core pieces remote from said gap, each being connected to one end of said ribbon.

9. The transducer head defined in claim 6, including a non-magnetic, conductive shield enclosing said transducer, said shield having an opening therein permitting movement of a magnetizable record body past said edge of said ribbon and the pole faces of said cores.

10. A magnetic transducer comprising: a single flat ribbon of conductive material; first and second oblong ferrite core pieces disposed on either side of and in intimate contact with a portion of said ribbon, said ribbon having a thickness considerably less than that of said core pieces, each of said core pieces having at least one parallel edge disposed in a common plane with one edge of the portion of said ribbon lying between said core pieces and being in contact with each other along a common line remote from said pole faces, the remaining portions of said ribbon substantially encircling one of said core pieces to form a single turn; and means for establishing electrical connections to the ends of said ribbon.

11. The transducer defined in claim 10 wherein the remaining portions of said ribbon substantially encircling one of said core pieces have edges forming an acute angle with said common plane.

12. The transducer defined in claim 10 wherein the remaining portions of said ribbon substantially encircling one of said core pieces have edges disposed in said common plane.

13. A magnetic transducer comprising: a pair of core pieces having adjacent pole faces, adjacent edges of said pole faces being disposed in a common plane; a unitary flat conductive band forming substantially a single turn about one of said core pieces, said band having a thickness considerably less than that of said core pieces, the portion of said band passing between said core pieces having one edge lying in said common plane; and means for establishing electrical connections with the ends of said band.

14. The magnetic transducer defined in claim 13 wherein said means for establishing electrical connections with the ends of said band includes a pair of flat overlaying conductor bars, each being connected to one of the ends of said band 15. The magnetic transducer defined in claim 13 wherein said core pieces are composed of a magnetic material having high magnetic permeability, low magnetic retentivity and high specific resistivity.

References Cited in the file of this patent
UNITED STATES PATENTS

| | | |
|---|---|---|
| 2,647,167 | Rettinger | July 28, 1953 |
| 2,673,896 | Rettinger | Mar. 30, 1954 |
| 2,693,508 | Lord | Nov. 2, 1954 |
| 2,694,754 | Connell | Nov. 16, 1954 |
| 2,761,911 | Camras | Sept. 4, 1956 |